United States Patent [19]

Taylor

[11] Patent Number: 4,538,851
[45] Date of Patent: Sep. 3, 1985

[54] AERODYNAMIC REAR VIEW MIRROR

[75] Inventor: Edward F. Taylor, Farmington Hills, Mich.

[73] Assignee: General Motors Corporation, Detroit, Mich.

[21] Appl. No.: 571,790

[22] Filed: Jan. 18, 1984

[51] Int. Cl.³ .............................................. B62D 35/00
[52] U.S. Cl. ....................................... 296/1 S; 296/91
[58] Field of Search ................... 296/1 S, 91; 248/476, 248/487; 340/98

[56] References Cited

U.S. PATENT DOCUMENTS

| D. 249,340 | 9/1978 | Braid | D12/16 |
|---|---|---|---|
| 3,522,584 | 8/1970 | Talbot | 340/98 |
| 3,635,517 | 1/1972 | Wilfert et al. | 296/1 S |
| 3,990,774 | 11/1976 | Gotz | 350/61 |
| 4,134,612 | 1/1979 | Nelson | 296/84 B |
| 4,196,930 | 4/1980 | Busche | 296/91 |
| 4,200,327 | 4/1980 | Wepler | 296/91 |
| 4,248,497 | 2/1981 | Leighton | 350/63 |
| 4,439,013 | 3/1984 | Hagn et al. | 350/307 |

FOREIGN PATENT DOCUMENTS 1475058 6/1974 United Kingdom .

Primary Examiner—Robert R. Song
Attorney, Agent, or Firm—Charles E. Leahy

[57] ABSTRACT

An aerodynamic rear view mirror includes a mirror glass mounted within a streamlined mirror housing having inboard and outboard side walls and top and bottom walls. The inboard side wall is concavely curved to define a rear portion nearly parallel with the door side window and a forward portion which curves inboard to reach around the pillar. The mirror housing is mounted on the vehicle body in generally parallel spaced relation relative the side window and the pillar to cooperate therewith in defining a curved airflow channel by which relatively clean air from in front of the windshield is ducted through the airflow channel around the pillar and onto the side window to thereby create an airflow barrier against foreign matter impingement on the side window and to streamline airflow from the front of the vehicle body around the side of the vehicle body. The housing is preferably mounted on the vehicle body by a mounting vane which extends longitudinally of the vehicle and has a negligible vertical dimension so that the airflow channel extends substantially the full height of the inboard side wall of the mirror housing.

7 Claims, 5 Drawing Figures

AERODYNAMIC REAR VIEW MIRROR

The invention relates to a rear view mirror and more particularly an aerodynamically shaped rear view mirror which streamlines airflow around the windshield pillar and creates a barrier adjacent the side window through which the mirror is viewed.

BACKGROUND OF THE INVENTION

It is well known that the presence of outside rear view mirrors mounted on a motor vehicle body have an aerodynamic effect on the airflow around the vehicle body. In order to reduce the aerodynamic drag of the vehicle body it has been known to mount the mirror within a housing defined by top, bottom and inboard and outboard side walls which diverge angularly from one another to present a tapered shape to oncoming airflow. Although such housing configurations are preferable to a housing presenting a bluff frontal shape to the oncoming airflow, the presence of such mirror housings as an appendage on the exterior of the vehicle body do nonetheless increase the aerodynamic drag relative to a motor vehicle with no exterior rear view mirror at all.

Aside from the aerodynamic considerations of exterior rear view mirrors, the prior art has also addressed the matter of decontaminating the side window adjacent the exterior rear view mirror to prevent a buildup of water or foreign matter which may attach to the side window in the line of sight between the occupant and the exterior mounted rear view mirror. For example, U.S. Pat. No. 4,200,327 by Manfred Wepler issued Apr. 29, 1980 proposes an air deflecting member mounted on the door in conjunction with the mounting of the mirror and providing a deflection of airflow past the side window away from the side window to thereby deflect contaminated airflow away from the side window portion adjacent the exterior rear view mirror.

Still other prior art patents such as U.S. Pat. No. 4,134,612 by Joseph Nelson issued Jan. 16, 1979, and U.S. Pat. No. 4,196,930 by Oscar Busche issued Apr. 8, 1980, provide air deflectors mounted on the vehicle bodies adjacent the rear view mirror for deflecting oncoming airflow onto the viewing surface of the rear view mirror in such a manner as to control the impact of foreign matter against the mirror glass. The shortcoming of these devices is that the addition of such deflecting vanes on the vehicle body adjacent the rear view mirrors work to increase the total frontal area of the vehicle and accordingly may increase the aerodynamic drag.

It would be desirable to provide an aerodynamic rear view mirror for a vehicle body which would be aesthetically pleasing, improve the vehicle aerodynamics and also limit the impingement of foreign matter on the side window and the mirror glass.

SUMMARY OF THE INVENTION

According to the present invention, a mirror glass is mounted within a streamlined mirror housing having inboard and outboard side walls and top and bottom walls. The inboard side wall is curved to define a rear portion nearly parallel with the door side window and a forward portion which curves inboard to reach around the pillar. The mirror housing is mounted on the vehicle body in generally parallel spaced relation relative the side window and the pillar to cooperate therewith in defining a curved airflow channel by which relatively clean air from in front of the windshield is ducted through the airflow channel around the pillar and onto the side window to thereby create an airflow barrier against foreign matter impingement on the side window and to streamline airflow from the front of the vehicle around the side of the vehicle body. The housing is preferably mounted on the vehicle body by a mounting vane which extends longitudinally of the vehicle and has a negligible vertical dimension so that the airflow channel extends substantially the full height of the inboard side wall of the mirror housing. The exact shape and dimension of the housing as well as the spacing from the vehicle body is determined by wind tunnel testing. In a modification of the invention, an air inlet opening is provided at the leading edge of the housing so that airflow from in front of the windshield also passes inside the housing and is exhausted around the periphery of the mirror glass to minimize the impingement of foreign matter on the mirror glass.

Accordingly, the object, feature and advantage of the invention resides in the provision of an exterior rear view mirror having a streamlined housing having an inboard generally vertical wall mounted in spaced relation from the vehicle side window and pillar and reaching inboard around the pillar to channel airflow from the front of the windshield to the region of the door side window.

A further object, feature and advantage of the invention resides in the provision of a streamlined mirror housing mounted on the vehicle body in spaced relation from the side window and the windshield pillar to define an airflow channel ducting airflow from the windshield onto the side window and further including an air intake opening in the leading edge of the housing to duct airflow from the windshield through the housing to an annular exhaust opening surrounding the mirror glass to prevent impingement of foreign matter on the mirror glass.

A further object, feature and advantage resides in the provision of a mirror structure formed integral with the windshield pillar and said windshield pillar defining an airflow duct inletting air from the windshield and exhausting air between the pillar and the mirror glass onto the side window to prevent the impingement of foreign matter onto the side window.

DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
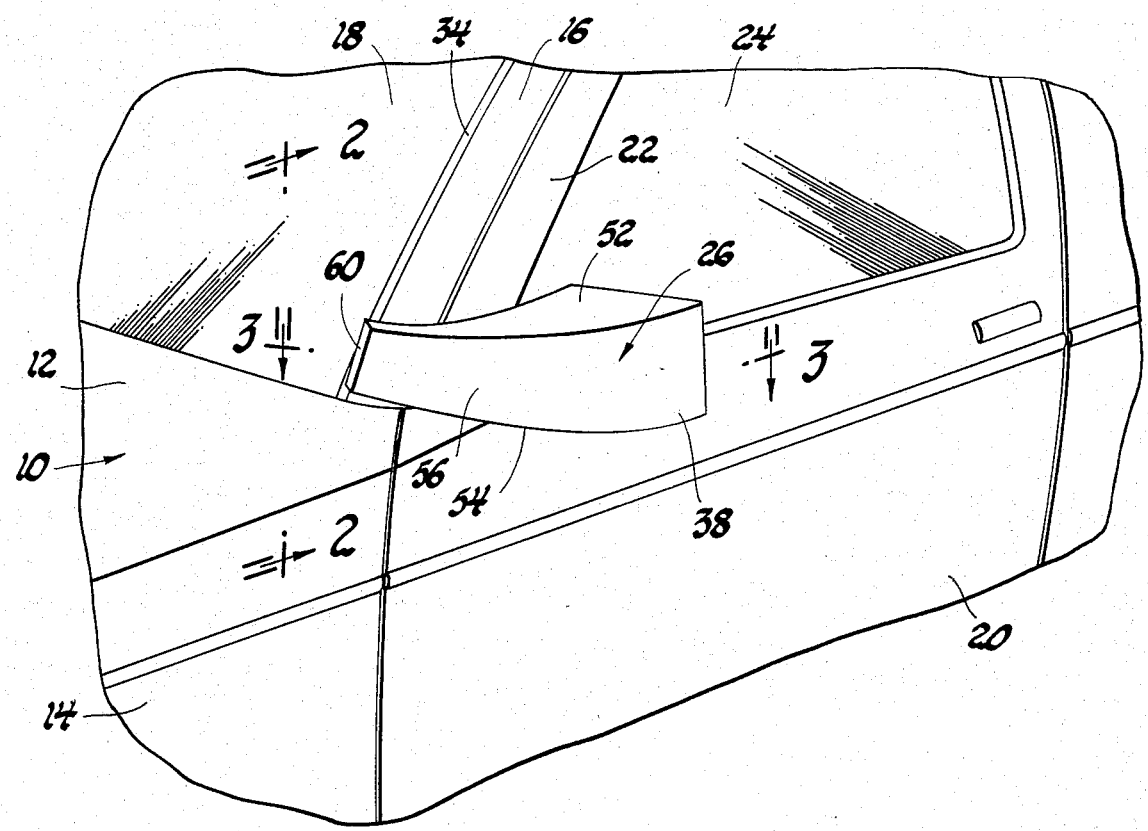
FIG. 1 is a perspective view of a vehicle body having an aerodynamic mirror according to the present invention.

Referring to FIG. 1 there is shown a vehicle body generally indicated at 10 and including an engine compartment lid 12, front fender 14, windshield pillar 16 and windshield 18. The vehicle body 10 also includes a door 20 having a window frame 22 and side window 24. An outside rear view mirror generally indicated at 26 is mounted on the door 20 of the vehicle body for outward swinging movement with the door when the door is opened.

Figure 3:
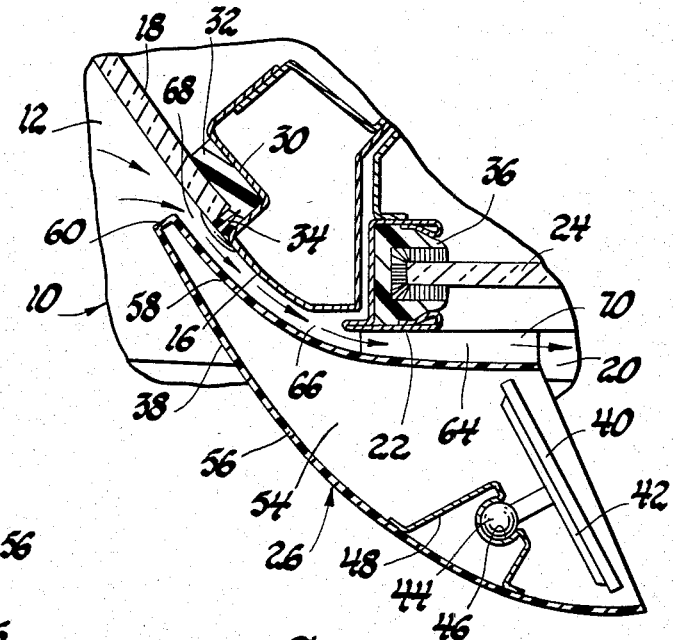
FIG. 3 is a sectional view taken in the direction of arrows 3—3 of FIG. 1.

Referring to FIG. 3, there is shown a section through the pillar of the vehicle body. The pillar 16 includes an inwardly offset flange 30 in which the windshield 18 is mounted by a bead of curable adhesive 32. A reveal molding 34 is inserted into the bead of the adhesive 32 and overlaps the windshield glass 18 and the pillar 16 to close the gap therebetween. The window frame 22 of the door 20 carries a window channel 36 which frictionally engages the side window 24 and permits the side window to be cranked up and down between open and closed positions.

As best seen in FIG. 3, the exterior rear view mirror 26 includes a housing 38 of injection molded plastic having a streamlined shape. The inside of the housing 38 is hollow to conserve plastic material and define a cavity in which the mirror glass 40 is mounted by a backing plate 42 and a ball swivel 44. Ball swivel 44 is rotatably mounted within a socket 46 of a mounting bracket 48 so that the mirror glass 40 can be adjusted by the vehicle occupant to provide the desired view rearwardly of the vehicle.

Figure 2:
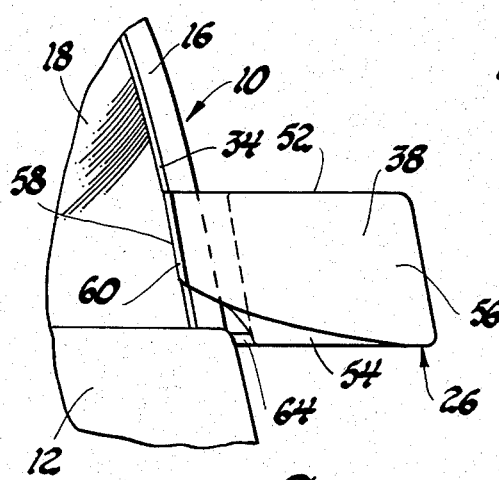
FIG. 2 is a front elevation view taken in the direction of arrows 2—2 of FIG. 1.

As best seen by reference to FIGS. 1, 2 and 3, the mirror housing 38 includes top wall 52, bottom wall 54, an outboard side wall 56 and an inboard side wall 58. These four walls are joined at their forward edges by a front wall 60. As best seen in FIG. 3, the inboard side wall 58 is concavely curved and the outboard side wall 56 is convexly curved. The side walls diverge from one another as they extend rearwardly from the front wall 60 to the mirror glass 40 which is mounted within the space between the rearward ends of the diverging concavo-convex side walls.

As best seen in FIG. 2, the mirror housing 38 is attached to the door 20 by a mounting flange 64. The mounting flange 64 preferably extends inboard from the inboard side wall 58 co-planar with the bottom wall 54 and is suitably attached to the door 20 adjacent the bottom edge of the side window 24. As best seen in FIGS. 2 and 3, the mounting flange 64 spaces the inboard wall 58 of the mirror away from the window 24, the window frame 22, pillar 16 and the windshield 18 to define therebetween an airflow channel 66 which is partially closed at the bottom by the mounting flange 64 and open at the top. The inboard housing wall 58 is convexly curved and extends over such a length that it reaches from the side window 24 around the pillar 16 into position adjacent with the windshield 18. Thus, the forwardmost edge of the inboard side wall 58 cooperates with the windshield 18 to define an inlet opening 68 to the airflow channel 66 while the rearwardmost edge of the inboard side wall 58 defines an outlet opening 70 adjacent to the side window 24. The mounting flange 64 is preferably of minimum vertical height and substantial longitudinal length so as to form a floor of the airflow channel 66 and act as a vane which also directs the oncoming airflow.

When the motor vehicle is in forward motion on the highway, the oncoming airflow impacts against the windshield glass 18 and also shears past the side window 24. A certain amount of tubulence is generated adjacent the pillar 16. By reaching around the pillar 16, the mirror housing 38 receives relatively clean air from the region ahead of the windshield 18 and ducts that air through the airflow channel 66 onto the side window 24. The effect of airflow so ducted is to create a barrier of clean air adjacent that area of the side window 24 through which the occupant views the rear view mirror glass 40 so that foreign matter is not impacted against that area of the side window. Furthermore, wind tunnel testing has demonstrated that the airflow channel 66 actually lowers the aerodynamic drag of the vehicle by channeling the air from in front of the windshield around the pillar and onto the side of the car body. The streamlined shade of the convexly curved outboard side wall 56 receives the oncoming airflow and the optimum shape of the mirror housing 38 and the width and height of the airflow channel 66 is determined for each vehicle configuration by wind tunnel testing.

Figure 4:
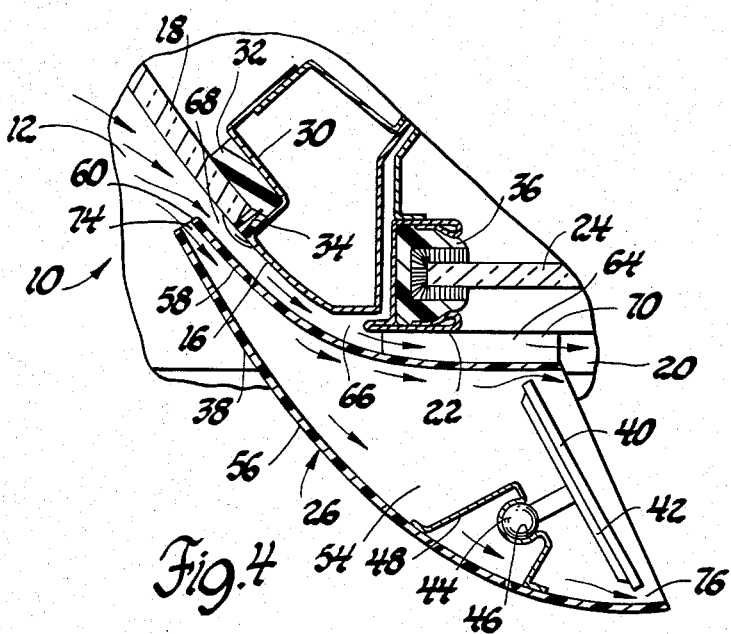
FIG. 4 is a view similar to FIG. 3 but showing a modification of the mirror housing to include an air intake opening at the leading edge thereof and an air exhaust opening surrounding the mirror glass.

Referring to FIG. 4, there is shown a mirror similar to that of FIG. 3 with like elements designated by like reference numerals. In the mirror housing of FIG. 4, the front wall 60 of the housing 38 is apertured to define an air intake opening 74 at the leading end of the mirror housing 38. At the opposite end of the mirror housing 38, the edges of the mirror glass 40 are spaced somewhat respectively from the top wall 52, bottom wall 54, outboard side wall 56 and inboard side wall 58 to define an annular exhaust opening 76. Accordingly, in the embodiment of FIG. 4 the relatively clean air in front of the windshield 18 is ducted through the intake opening 74 into the hollow cavity of the mirror housing 38 and then exhausted through the annular exhaust opening 76 around the mirror glass 40. This airflow path surrounding the mirror glass 40 creates an airflow barrier effective to reduce the impingement of foreign matter onto the mirror glass 40.

Figure 5:
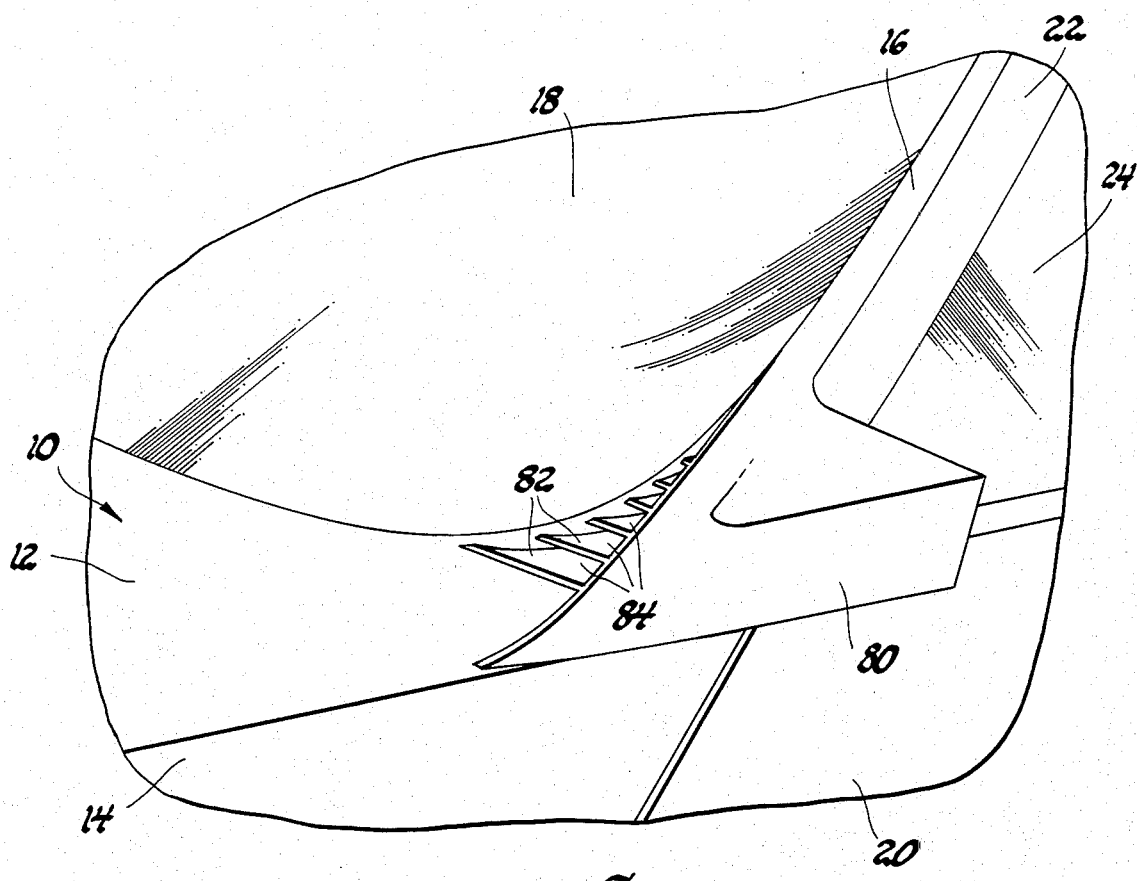
FIG. 5 is another embodiment of the invention wherein the mirror housing and airflow channel are defined integral with the pillar structure of the motor vehicle body.

Referring to FIG. 5, there is shown a further embodiment of the invention in which the mirror housing is defined integral with the pillar structure of the vehicle body 10. More particularly as seen in FIG. 5 is the mirror housing 80 formed of metal or plastic integral with the pillar 16. The pillar has a plurality of openings 82 defined by vanes 84. Accordingly, airflow from the region of the windshield 18 is ducted through the openings 82 which extend through the mirror housing 80 and exit onto the side window 24. The mirror housing 80 of FIG. 5 may also be mounted on the vehicle door for swinging movement therewith between a door open position and a door closed position in which the airflow cavity or channel of the mirror housing 80 communicates with the openings 82 in the windshield pillar 16.

Thus, it is seen that the invention provides a new and improved exterior rear view mirror having a housing mounted in spaced relation from the vehicle body and reaching around the windshield pillar to duct airflow from the high pressure region in front of the windshield onto the side window to create a barrier against foreign matter impingement and to also effectively reduce the drag of the vehicle body by streamlining airflow around the pillar.

The invention has been described herein in terms of the particular preferred embodiment of the aerodynamic mirror as shown in the drawings for use in conjunction with the vehicle body having the particular constructional characteristics and shape as shown in the drawings. However, it will be understood that the aerodynamic mirror of this invention may have alternate features of construction within the scope of the appended claims. For example, if the pillar were to be somewhat wider than the pillar shown in the vehicle so that the pillar extended more toward the center line of the vehicle, the aerodynamic mirror may function properly by merely reaching around the pillar without reaching so far around as to overlap the windshield glass itself. The preferred size and shape of the mirror housing and the extent to which the housing reaches around the pillar and the dimension of spacing of the housing inboard side wall relative the vehicle body are determined by wind tunnel testing.

The embodiments of the invention in which an exclusive property or privilege is claimed are defined as follows:

1. In combination with a vehicle body having a windshield pillar defining the intersection between the windshield and the door side window of a vehicle body, a rear view mirror mounted on the vehicle body for rear viewing through the side window comprising:

a mirror glass;

a housing mounting the mirror glass and having an inboard side wall extending generally vertically and curved to define a rear portion generally parallel with the side window and a forward portion reaching inboard around the pillar, said inboard side wall being situated in spaced relationship relative the side window and the pillar to cooperate therewith in defining an airflow channel therebetween by which relatively clean air from the region in front of the windshield is ducted through the airflow channel around the pillar to the region of the side window to thereby create an airflow barrier against contamination of the side window and to streamline airflow around the vehicle body.

2. An external rear view mirror adapted for mounting on a vehicle body having a windshield pillar defining the intersection between the windshield and the door side window of the vehicle body comprising:

a mirror glass and a housing enclosing the mirror glass, said housing having a concavely curved inboard side wall and mounting means mounting the housing on the vehicle body with the inboard side wall in spaced relation from the pillar whereby the concavely curved inboard side wall extends from the region of the windshield to the region of the side window and defines therebetween an airflow channel by which relatively clean air from in front of the windshield is ducted through the airflow channel around the pillar to the region of the side window to thereby create an airflow barrier against contamination of the side window and to streamline airflow around the vehicle body.

3. An external rear view mirror adapted for mounting on a vehicle body having a windshield pillar defining the intersection between the windshield and the door side window of the vehicle body comprising:

a mirror glass and a housing enclosing the mirror glass, said housing having an inboard side wall and an outboard side wall with at least said inboard side wall being concavely curved whereby upon mounting of the housing on the vehicle body with the rearward portion of the inboard side wall mounted in generally parallel spaced relationship relative the side window and pillar, the forward portion of the inboard side wall is established in spaced juxtaposed relationship relative the windshield so that the housing cooperates with the vehicle body in defining an airflow channel by which relatively clean air from in front of the windshield is ducted through the airflow channel around the pillar to the region of the side window to thereby create an airflow barrier against contamination of the side window and to streamline airflow around the vehicle body.

4. An external rear view mirror adapted for mounting on a vehicle body having a windshield pillar defining the intersection between the windshield and the door side window of the vehicle body comprising:

a mirror glass and a housing having a concavely curved inboard side wall and a convexly curved outboard side wall diverging from one another to enclose the mirror glass, and means mounting the housing of the vehicle body with the rearward portion of the inboard side wall mounted in generally parallel spaced relationship relative the side window and pillar and the forward portion of the inboard side wall established in spaced juxtaposed relationship relative the windshield so that the housing cooperates with the vehicle body in defining an airflow channel by which relatively clean air from in front of the windshield is ducted through the airflow channel around the pillar to the region of the side window to thereby create an airflow barrier against foreign matter impingement on the side window and to streamline airflow around the vehicle body.

5. An external rear view mirror adapted for mounting on a vehicle body having a windshield pillar defining the intersection between the windshield and the door side window of the vehicle body comprising:

a mirror glass and a housing having housing walls including a concavely curved inboard side wall and a convexly curved outboard side wall diverging from one another to define a cavity enclosing the mirror glass at the rearward end of the housing, an air inlet opening provided in the forward end of the housing to inlet the oncoming airflow into the cavity, said walls being spaced from the mirror glass to define an air outlet opening thereover outleting airflow from the cavity to create an airflow barrier around the mirror glass against impingement of foreign matter on the mirror glass, and means mounting the housing of the vehicle body with the rearward portion of the inboard side wall mounted in generally parallel spaced relationship relative the side window and pillar and the forward portion of the inboard side wall established in spaced juxtaposed relationship relative the windshield so that the housing cooperates with the vehicle body in defining an airflow channel by which relatively clean air from in front of the windshield is ducted through the airflow channel around the pillar to the region of the side window to thereby create an airflow barrier against foreign matter impingement on the side window and to streamline airflow around the vehicle body.

6. An external rear view mirror adapted for mounting on a vehicle body having a windshield pillar defining the intersection between the windshield and the door side window of the vehicle body comprising:

a mirror glass and a housing enclosing the mirror glass, said housing having a concavely curved inboard side wall and a mounting flange mounting the housing on the vehicle body with the inboard side wall in spaced relation from the pillar to define an airflow channel extending from the region of the windshield to the region of the side window by which relatively clean air from in front of the windshield is ducted through the airflow channel around the pillar to the region of the side window to thereby create an airflow barrier against contamination of the side window and to streamline airflow around the vehicle body, said mounting flange extending generally horizontally and having minimal vertical height and substantial longitudinal length to define a horizontal airflow directing vane assisting in streamline airflow around the vehicle body.

7. In combination, a vehicle body having a windshield pillar supporting a windshield and a vehicle side door mounting a side window, a mirror housing carried by the windshield pillar, a mirror glass mounted in the mirror housing, air inlet opening means provided in the windshield pillar adjacent the windshield and communicating with the mirror housing, and air exhaust outlet means in the mirror housing disposed adjacent the side window, said air inlet opening means cooperating with the mirror housing and the air exhaust outlet means to define an airflow channel whereby to communicate oncoming airflow during vehicle forward motion from the region of the windshield through the air inlet opening and through the mirror housing and the air exhaust outlet means to the region of the side window to create an airflow barrier against impingement of foreign matter against the side window and to streamline airflow around the vehicle body.

\* \* \* \* \*